United States Patent
Frayer, III et al.

(10) Patent No.: US 10,029,558 B2
(45) Date of Patent: Jul. 24, 2018

(54) GRILLE SHUTTER ASSEMBLY

(71) Applicant: SRG Global, Inc., Warren, MI (US)

(72) Inventors: Robert W. Frayer, III, Ferndale, MI (US); Gurudath S. Narayan, Birmingham, MI (US); Peter John Cristino, Warren, MI (US)

(73) Assignee: SRG Global, Inc., Troy, MI (US)

( * ) Notice: Subject to any disclaimer, the term of this patent is extended or adjusted under 35 U.S.C. 154(b) by 816 days.

(21) Appl. No.: 13/834,399

(22) Filed: Mar. 15, 2013

(65) Prior Publication Data

US 2014/0273806 A1   Sep. 18, 2014

(51) Int. Cl.
*B60K 11/08*   (2006.01)

(52) U.S. Cl.
CPC ............. B60K 11/085 (2013.01); *Y02T 10/88* (2013.01)

(58) Field of Classification Search
CPC ......... B60K 11/08; B60K 11/085; F24F 13/15
USPC ............... 454/335, 143, 155, 154, 145, 166; 180/68.1
See application file for complete search history.

(56) References Cited

U.S. PATENT DOCUMENTS

| | | |
|---|---|---|
| 4,064,934 A | 12/1977 | Kolthoff, Jr. et al. |
| 4,457,558 A | 7/1984 | Ishikawa |
| 4,534,506 A | 8/1985 | Ishida et al. |
| 4,753,288 A | 6/1988 | Harvey |
| 5,732,666 A | 3/1998 | Lee |
| 5,734,727 A | 3/1998 | Flaherty et al. |
| 6,174,025 B1 | 1/2001 | Henderson, III et al. |
| 6,553,719 B1 | 4/2003 | Stone et al. |
| 6,695,047 B2 | 2/2004 | Brocksopp |
| 7,498,926 B2 | 3/2009 | Browne et al. |
| 7,717,208 B2 | 5/2010 | Knauer |
| 7,757,643 B2 | 7/2010 | Harich et al. |
| 7,866,737 B2 | 1/2011 | Browne et al. |
| 8,091,516 B2 | 1/2012 | Preiss |
| 8,161,919 B2 | 4/2012 | Klotz et al. |
| 2001/0017479 A1 | 8/2001 | Birndorfer et al. |
| 2002/0153182 A1 | 10/2002 | Vaillancourt et al. |
| 2006/0060401 A1 | 3/2006 | Bole |
| 2006/0102399 A1 | 5/2006 | Guilfoyle et al. |
| 2007/0077880 A1 | 4/2007 | Lee et al. |

(Continued)

FOREIGN PATENT DOCUMENTS

| | | |
|---|---|---|
| DE | 2908734 A1 | 9/1980 |
| DE | 2908734 A1 | 9/1980 |

(Continued)

OTHER PUBLICATIONS

International Search Report regarding Application No. PCT/US2014/022365, dated Jun. 25, 2014.

(Continued)

*Primary Examiner* — Steven B McAllister
*Assistant Examiner* — Ko-Wei Lin

(57) ABSTRACT

A vehicle grille shutter assembly is provided that may include first and second louvers and a drive link. The first louver may be mounted for rotation about a first rotational axis. The second louver may be mounted for rotation about a second rotational axis. The first and second rotational axes may be angled relative to each other. The drive link may be connected to the first and second louvers and may transmit rotational motion of the first louver to the second louver.

20 Claims, 8 Drawing Sheets

(56) References Cited

U.S. PATENT DOCUMENTS

| | | | |
|---|---|---|---|
| 2008/0073920 A1 | 3/2008 | Knauer | |
| 2009/0066096 A1 | 3/2009 | Doroghazi et al. | |
| 2009/0133943 A1* | 5/2009 | Noguchi | B60K 1/04 180/65.21 |
| 2009/0140549 A1 | 6/2009 | Doroghazi et al. | |
| 2010/0071977 A1* | 3/2010 | Ritz | B60K 11/085 180/68.1 |
| 2010/0083918 A1 | 4/2010 | Tregnago et al. | |
| 2010/0139583 A1* | 6/2010 | Klotz | B60K 11/085 123/41.04 |
| 2010/0236503 A1 | 9/2010 | Bernt et al. | |
| 2010/0243351 A1 | 9/2010 | Sakai | |
| 2010/0243352 A1* | 9/2010 | Watanabe | B60K 11/085 180/68.1 |
| 2010/0282533 A1 | 11/2010 | Sugiyama | |
| 2011/0005851 A1 | 1/2011 | Doroghazi et al. | |
| 2011/0048691 A1* | 3/2011 | Shin | F01P 7/12 165/299 |
| 2011/0070817 A1 | 3/2011 | Walters | |
| 2011/0073395 A1 | 3/2011 | Lee et al. | |
| 2011/0181062 A1 | 7/2011 | Bernt et al. | |
| 2011/0247779 A1* | 10/2011 | Charnesky | B60K 11/085 165/41 |
| 2012/0019025 A1 | 1/2012 | Evans et al. | |
| 2012/0067655 A1 | 3/2012 | Charnesky et al. | |
| 2012/0074729 A1 | 3/2012 | Fenchak et al. | |
| 2012/0119059 A1 | 5/2012 | Crane et al. | |
| 2012/0132474 A1* | 5/2012 | Charnesky | B60K 11/085 180/68.1 |
| 2012/0247018 A1 | 10/2012 | Stokes et al. | |
| 2013/0012115 A1* | 1/2013 | Schwarz | B60K 11/085 454/155 |
| 2014/0167451 A1* | 6/2014 | Klop | B60K 11/085 296/193.1 |

FOREIGN PATENT DOCUMENTS

| | | | |
|---|---|---|---|
| DE | 3151435 A1 | 7/1982 | |
| DE | 3151435 A1 | 7/1982 | |
| DE | 3929023 C1 | 9/1990 | |
| DE | 3929023 C1 | 9/1990 | |
| DE | 20021023 U1 | 2/2001 | |
| DE | 20021023 U1 | 2/2001 | |
| DE | 102004048038 A1 | 4/2006 | |
| DE | 102004048038 A1 | 4/2006 | |
| DE | 102006054970 A1 | 5/2008 | |
| DE | 102006054970 A1 | 5/2008 | |
| EP | 2371602 A1 | 10/2011 | |
| EP | 2371602 A1 | 10/2011 | |
| EP | 2371603 A1 | 10/2011 | |
| EP | 2407333 A1 | 1/2012 | |
| FR | 2404557 A1 | 4/1979 | |
| FR | 2404557 A1 | 4/1979 | |
| FR | 2404557 | * 6/1979 | |
| JP | 64018744 U | 1/1989 | |
| JP | 64018744 U | 1/1989 | |
| JP | 01277616 A | 11/1989 | |
| JP | 01277616 A | 11/1989 | |
| JP | 2001048058 A | 2/2001 | |
| JP | 2001048058 A | 2/2001 | |
| JP | 2010-223150 A | 10/2010 | |
| JP | 201235839 A | 2/2012 | |
| KR | 20-1998-0029430 | 8/1998 | |
| KR | 20-1998-0064750 | 11/1998 | |
| KR | 10-2012-0053116 | 5/2012 | |
| KR | 10-2012-0113956 | 10/2012 | |
| WO | 2006056359 A1 | 6/2006 | |
| WO | WO-2006056359 A1 | 6/2006 | |
| WO | 2007108803 A1 | 9/2007 | |
| WO | WO-2007108803 A1 | 9/2007 | |
| WO | 2011008253 A1 | 1/2011 | |
| WO | 2011009212 A1 | 1/2011 | |
| WO | WO-2011008253 A1 | 1/2011 | |
| WO | WO-2011009212 A1 | 1/2011 | |

OTHER PUBLICATIONS

Written Opinion of the International Searching Authority regarding Application No. PCT/US2014/022365, dated Jun. 25, 2014.
International Preliminary Report on Patentability and Written Opinion regarding Application No. PCT/US2014/022370 dated Sep. 15, 2015.
International Preliminary Report on Patentability regarding International Application No. PCT/US2010/001939 dated Jan. 17, 2012.
International Search Report and Written Opinion regarding Application No. PCT/US2012/026428, dated Nov. 30, 2012.
International Search Report regarding Application No. PCT/US2010/001939 dated Oct. 6, 2010.
U.S. Office Action regarding U.S. Appl. No. 12/801,403 dated Aug. 21, 2012.
U.S. Office Action regarding U.S. Appl. No. 13/239,527 dated Dec. 5, 2012.
International Search Report and Written Opinion regarding Application No. PCT/US2011/052710 dated Apr. 30, 2012.
European Search Report dated Dec. 13, 2016, 11 pgs.
JP Office Action dated Nov. 29, 2017.

* cited by examiner

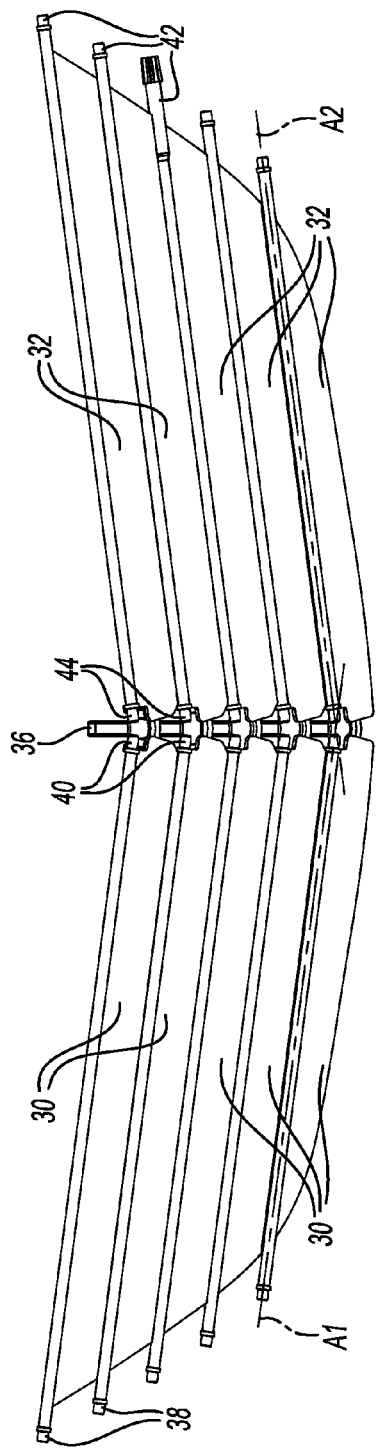
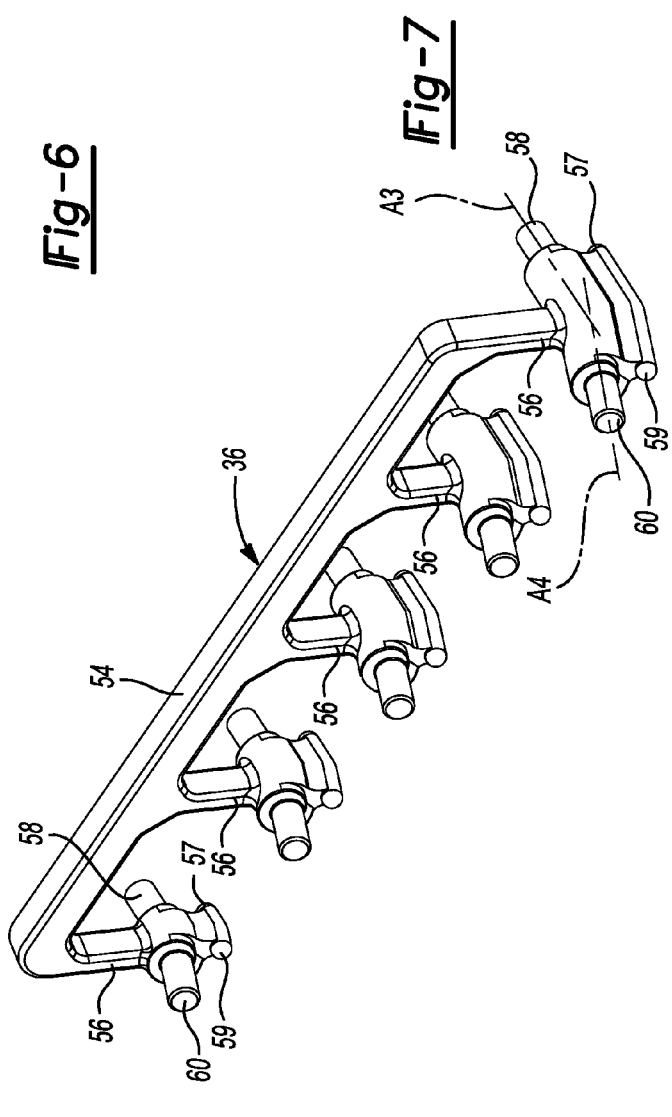

GRILLE SHUTTER ASSEMBLY

FIELD

The present disclosure relates to a shutter assembly, and more particularly, to a grille shutter assembly for a vehicle.

BACKGROUND

This section provides background information related to the present disclosure and is not necessarily prior art.

Many automotive vehicles include a grille mounted to a front end of the vehicle. Grilles are often an important component of the vehicle's aesthetic appeal and may serve to identify a brand of the vehicle. A grille may allow airflow into an engine or motor compartment of the vehicle to cool various vehicle components such as a radiator, an engine and/or an electric motor, for example, and/or various vehicle fluids such as coolant, lubricants and/or refrigerant, for example. While this airflow into the engine compartment may be desirable under certain operating conditions, it may also increase aerodynamic drag on the vehicle, which can reduce fuel efficiency. A grille shutter assembly may be provided to selectively block airflow into the engine compartment under predetermined operating conditions to reduce aerodynamic drag on the vehicle and increase fuel efficiency.

SUMMARY

This section provides a general summary of the disclosure, and is not a comprehensive disclosure of its full scope or all of its features.

The present disclosure provides a vehicle grille shutter assembly that may include first and second louvers and a drive link. The first louver may be mounted for rotation about a first rotational axis. The second louver may be mounted for rotation about a second rotational axis. The first and second rotational axes may be angled relative to each other. The drive link may be connected to the first and second louvers and may transmit rotational motion of the first louver to the second louver.

In some embodiments, the drive link may include first and second pegs defined by first and second longitudinal axes, respectively. The first and second longitudinal axes may be angled relative to each other.

In some embodiments, the first louver may include a first end and a second end. The second louver may include a first end and a second end. The first end of the first louver may be drivingly connected to a drive motor. The drive link may be connected to the first and second louvers proximate the second ends of the first and second louvers.

In some embodiments, the grille shutter assembly may include a plurality of third louvers substantially parallel to the first louver and a plurality of fourth louvers substantially parallel to the second louver. The drive link may be connected to the third louvers and the fourth louvers and may transmit rotational motion of the first louver to the third and fourth louvers.

In some embodiments, the drive link may include an elongated body and a plurality of arms extending from the elongated body. Each of the arms may include first and second pegs extending away from each other and angled relative to each other.

In some embodiments, the first and second louvers may be rotatably supported by first and second bars, respectively, of a grille.

In some embodiments, the first louver may restrict airflow between the first bar and a third bar of the grille when the first louver is in a closed position. The second louver may restrict airflow between the second bar and a fourth bar of the grille when the second louver is in a closed position.

In some embodiments, the first and second louvers may be rotatably supported by a frame of the grille. The frame may define an opening that may be at least partially traversed by the first and second bars.

In some embodiments, the first and second bars may include integrally formed flanges having apertures that rotatably support the first and second louvers.

In another form, the present disclosure provides an assembly for a vehicle that may include a grille, a plurality of first louvers, and a plurality of second louvers. The grille may include an outer frame, a plurality of first bars and a plurality of second bars. The outer frame may define an opening. The first and second bars may be attached to the frame and may extend across at least a portion of the opening. The plurality of first louvers may be mounted to the grille and rotatable relative to the grille. The first louvers may be mounted at a first end to the outer frame and mounted at a second end to corresponding ones of the first bars. The plurality of second louvers may be mounted to the grille and may be rotatable relative to the grille. The second louvers may be mounted at a first end to the outer frame and mounted at a second end to corresponding ones of the second bars.

In some embodiments, the first bars may be parallel to each other. The second bars may be parallel to each other and angled relative to the first bars.

In some embodiments, the assembly may include a drive link connected to the first and second louvers and transmitting rotational motion of one of the first louvers to the rest of the first louvers and the second louvers.

In some embodiments, the first louvers may be rotatable about first rotational axes. The second louvers may be rotatable about second rotational axes. The first rotational axes may be angled relative to the second rotational axes.

In some embodiments, an angle between the first and second rotational axes may be substantially equal to an angle between the first and second bars.

In some embodiments, the drive link may include first and second pegs defined by first and second longitudinal axes, respectively. An angle between the first and second longitudinal axes may be substantially equal to the angle between the first and second bars.

In some embodiments, each of the first louvers may include a first end and a second end. Each of the second louvers may include a first end and a second end. The first end of only one of the first louvers may be drivingly connected to a drive motor. The drive link may be connected to the first and second louvers proximate the second ends of the first and second louvers.

In some embodiments, the drive link may include an elongated body and a plurality of arms extending from the elongated body. Each of the arms may include first and second pegs extending away from each other and angled relative to each other. The first and second pegs may engage the first and second louvers.

In some embodiments, the first and second bars may be substantially horizontal and may be angled relative to each other about an axis extending through a central, vertical bar of the grille.

In some embodiments, the first and second bars may include integrally formed flanges having apertures rotatably supporting the first and second louvers.

In some embodiments, the first and second bars may be integrally formed with the outer frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a perspective view of louvers and a drive link of the grille shutter assembly;

FIG. 7 is a perspective view of the drive link;

Corresponding reference numerals indicate corresponding parts throughout the several views of the drawings.

DETAILED DESCRIPTION

Figure 1:
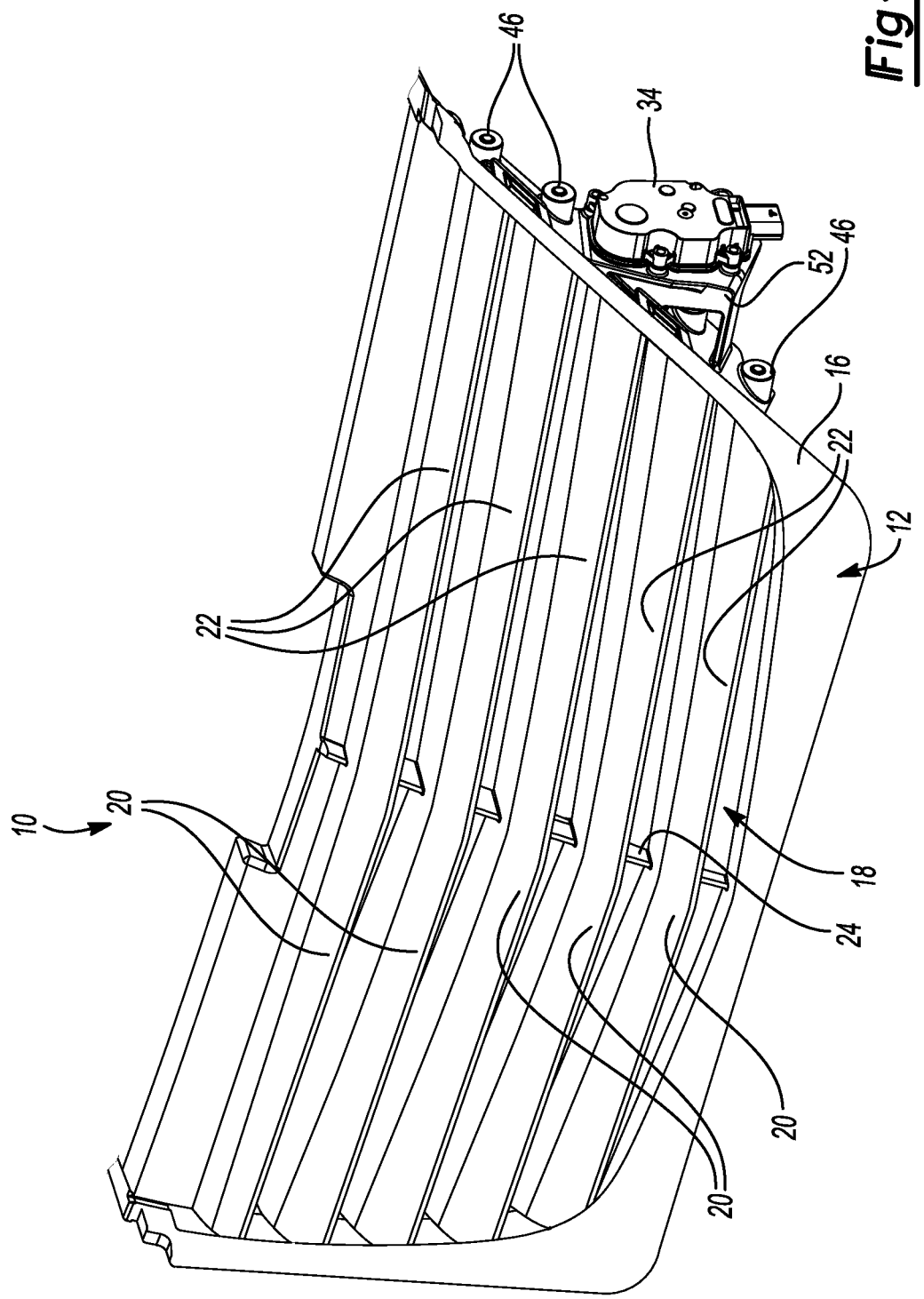
FIG. 1 is a front perspective view of a grille assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
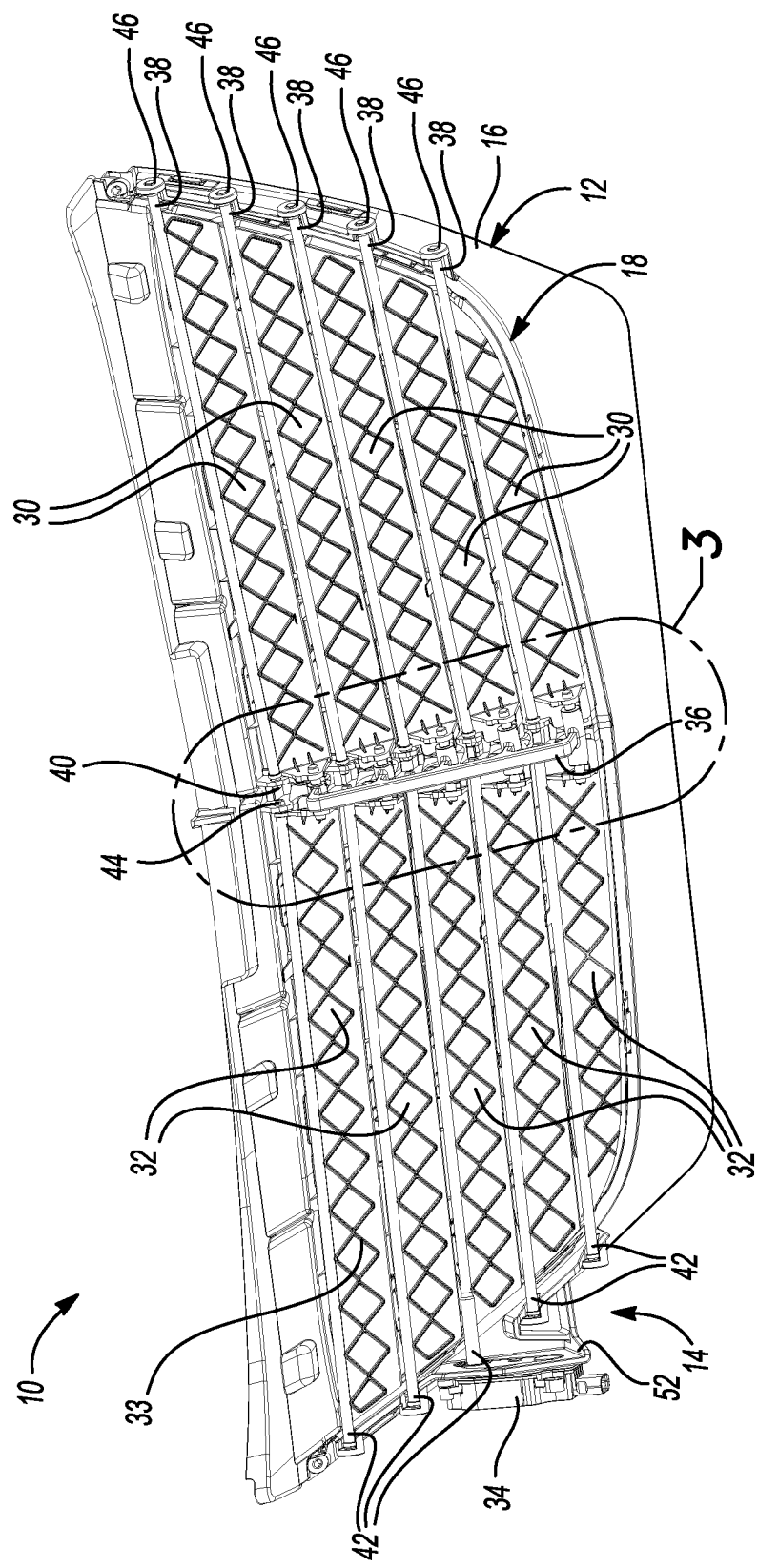
FIG. 2 is a rear perspective view of the grille assembly of FIG. 1.

With reference to FIGS. 1 and 2, a grille assembly 10 is provided that may include a grille 12 and a grille shutter assembly 14 (FIG. 2). The grille 12 may be attached to a front end of a vehicle. The grille shutter assembly 14 may selectively allow and restrict airflow through the grille 12 based on one or more operating conditions, such as vehicle speed, throttle position, engine speed, engine load, engine temperature, electric-motor-temperature (e.g., for an electric or hybrid-electric vehicle), coolant temperature or pressure, lubricant temperature or pressure, and/or refrigerant temperature or pressure, for example, and/or other vehicle operating conditions.

The grille 12 may include an outer frame 16 having structure for mounting the assembly 10 to the vehicle and may define an opening 18. As shown in FIG. 1, the grille 12 includes a plurality of first horizontal ribs or bars 20, a plurality of second horizontal ribs or bars 22, and a central, generally vertical rib or bar 24. The bars 20, 22, 24 may at least partially traverse the opening 18. The first horizontal bars 20 may be substantially parallel to each other. The second horizontal bars 22 may be substantially parallel to each other and angled relative to the first horizontal bars 20 about an axis defined by or extending through the central vertical bar 24. Some or all of the bars 20, 22, 24 may be integrally formed with each other and/or the frame 16 via a molding process, for example. One or more of the bars 20, 22, 24 and/or the frame 16 may include a chrome plating, for example, or any other decorative plating, coating and/or finish.

It will be appreciated that the grille 12 could include any number of bars shaped and configured in a wide variety of ways to achieve a desired aesthetic appeal. Therefore, the principles of the present disclosure are not limited to grilles having the types and configuration of bars 20, 22, 24 described above and shown in the figures. For example, in some embodiments, the grille 12 may include a wire mesh or honeycomb configuration instead of or in addition to any one or more of the bars 20, 22, 24.

Figure 3:
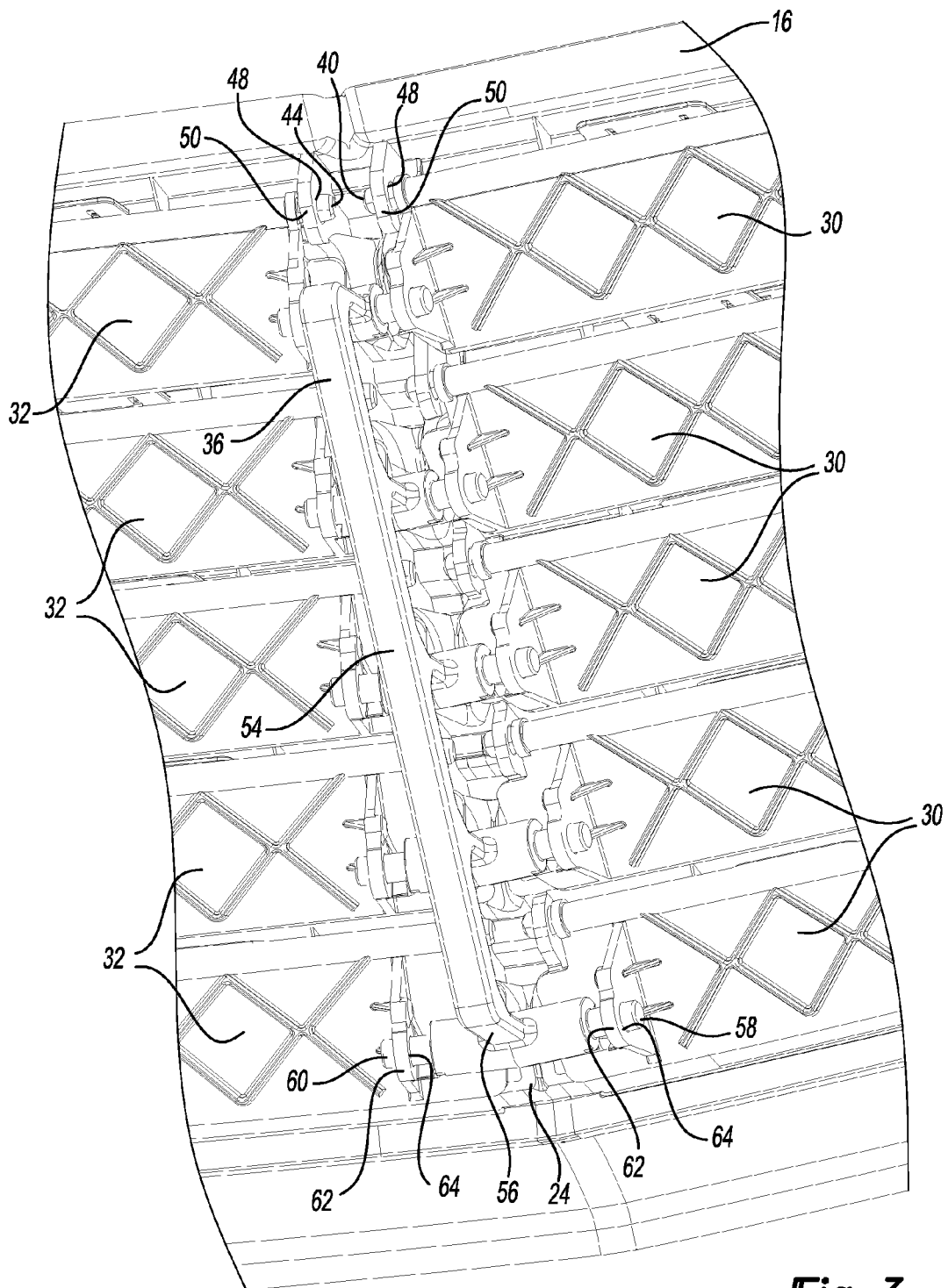
FIG. 3 is a partial perspective view of a shutter assembly of the grille assembly.
Figure 4:
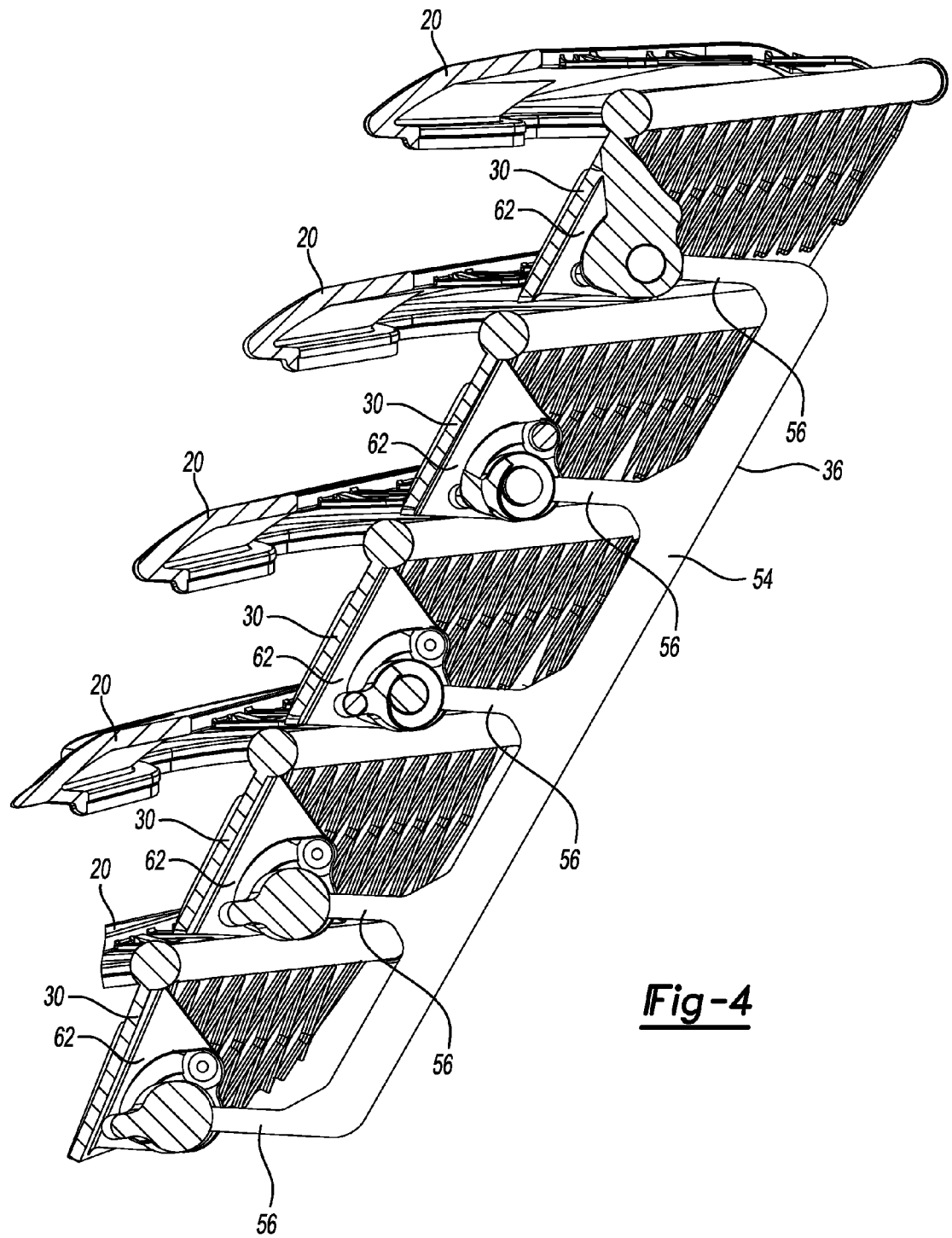
FIG. 4 is a partial cross-sectional view of the grille assembly with louvers of the shutter assembly in a closed position.
Figure 5:
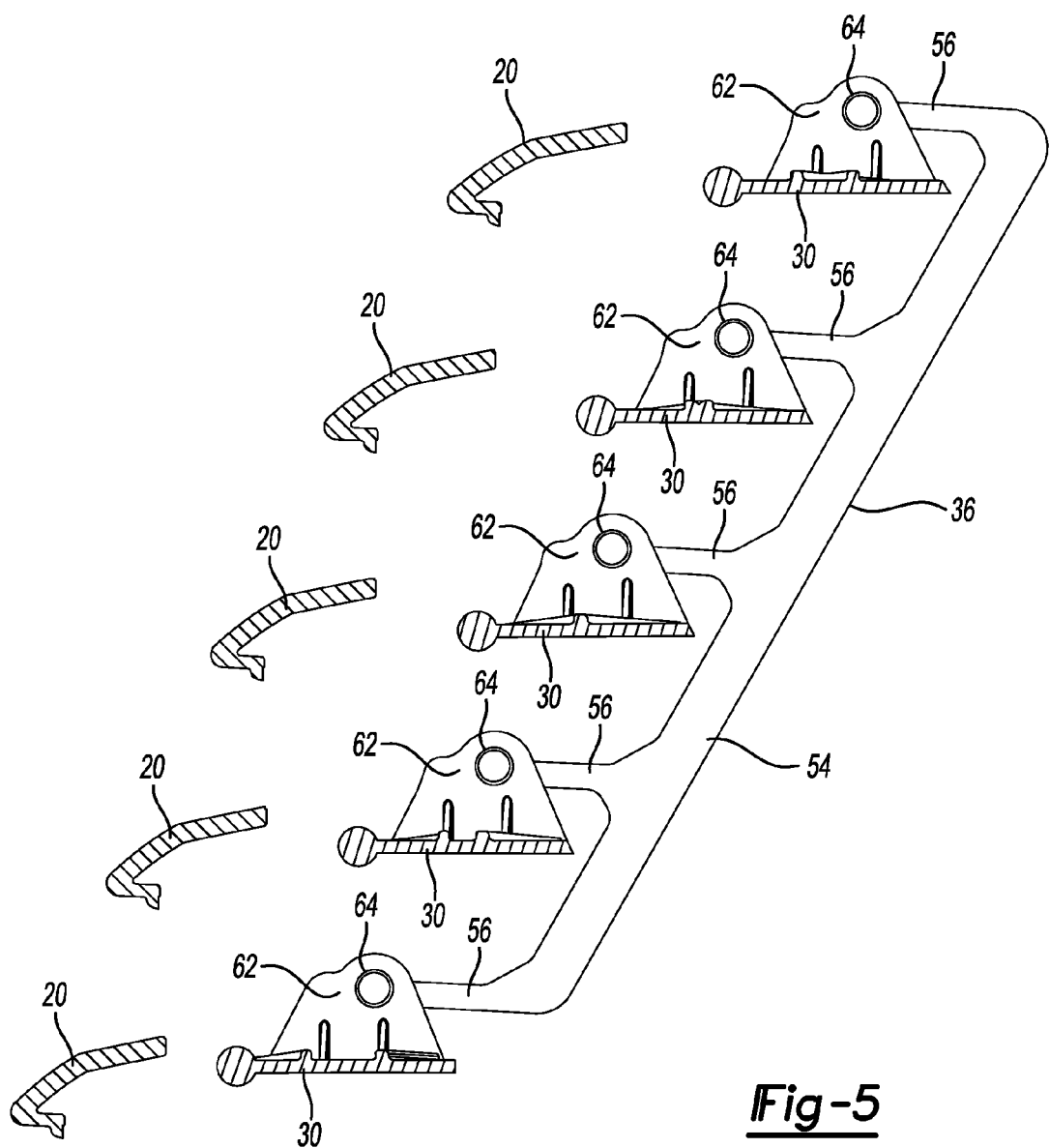
FIG. 5 is a partial cross-sectional view of the grille assembly with the louvers in an open position.

As shown in FIG. 2, the grille shutter assembly 14 may include a plurality of first louvers 30, a plurality of second louvers 32, a drive motor 34 and a drive link 36. Each of the first louvers 30 may include a first axle peg 38 and a second axle peg 40 (FIGS. 2, 3, and 6). Similarly, each of the second louvers 32 may include a first axle peg 42 and a second axle peg 44. The axle pegs 38, 42 may be disposed along an edge of the louvers 30, 32 or at any other location on the louvers 30, 32. Each of the first axle pegs 38, 42 of the louvers 30, 32 may extend through apertures 46 formed in the frame 16. The apertures 46 may define bearing surfaces rotatably supporting the first axle pegs 38, 42. Each of the second axle pegs 40, 44 may extend through apertures 48 (FIG. 3) formed in flanges 50 that may extend from the central vertical bar 24, from each of the horizontal bars 20, 22 at locations proximate the central vertical bar 24, or from any other suitable location. The apertures 48 may define bearing surfaces rotatably supporting the second axle pegs 40, 44. Each of the apertures 46, 48 may be substantially vertically aligned with a corresponding one of the horizontal bars 20, 22 so that an edge of each louver 30, 32 extending between the first and second axle pegs 38, 42 and 40, 44 may be substantially vertically aligned with a corresponding one of the horizontal bars 20, 22 (as shown in FIGS. 4 and 5). In some embodiments, bearing inserts may be received in the apertures 46, 48 to rotatably support the axle pegs 38, 40, 42, 44.

The first and second axle pegs 38, 40 of each first louver 30 may cooperate to define a first rotational axis A1 (FIG. 6) of the first louver 30. Similarly, the first and second axle pegs 42, 44 of each second louver 32 may cooperate to define a second rotational axis A2 (FIG. 6) of the second louver 32. The rotational axes A1, A2 may be angled relative to each other. An angle between the axes A1, A2 may correspond to the angle between the first and second horizontal bars 20, 22.

The drive motor 34 may be mounted to a bracket 52 that may be integrally formed with or attached to the frame 16. The drive motor 34 can be any suitable type of motor and may be controlled by an electronic control module, for example. As described above, the control module may operate the drive motor 34 based on one or more vehicle operating conditions. The drive motor 34 may be drivingly connected to one of the first axle pegs 38, 42 and may cause rotation of the louvers 30, 32 relative to the grille 12 between an open position (FIG. 5) and a closed position (FIGS. 2-4). In the open position, air may flow through the grille 12 and into a compartment of the vehicle to cool various vehicle components. In the closed position, air may be restricted or prevented from flowing through the grille 12, and instead, is directed around the exterior of the front end of the vehicle.

It will be appreciated that the louvers 30, 32 may be moved to any of a plurality of positions between the fully open and fully closed positions.

While the drive motor 34 is described above as being drivingly connected to one of the first axle pegs 38, 42 of the louvers 30, 32, in some embodiments, the drive motor 34 may be drivingly connected to one of the second axle pegs 40, 44. In some embodiments, the drive motor 34 may drivingly engage the drive link 36 to move the louvers 32, 34.

As shown in the figures, the drive link 36 may be attached to each of the louvers 30, 32 to fix the louvers 30, 32 to each other so that rotation of one of the louvers 30, 32 causes corresponding rotation of the rest of the louvers 30, 32. In this manner, when operation of the drive motor 34 rotates the one of the louvers 30, 32 connected thereto, all of the louvers 30, 32 may rotate in sync with each other.

As shown in FIG. 7, the drive link 36 may include an elongated body 54 having a plurality of legs 56 extending therefrom. A distal end of each of the legs 56 may include first and second cylindrical pegs 58, 60 extending laterally outwardly therefrom. Each of the first pegs 58 may be defined by a corresponding longitudinal axis A3. Each of the second pegs 60 may be defined by a corresponding longitudinal axis A4. The axes A3, A4 may be angled relative to each other. An angle between the axes A3, A4 may be selected to correspond to the angle between the first and second louvers 30, 32, which in turn, may be selected to correspond to the angle between the first and second horizontal bars 20, 22 of the grille 12.

Figure 8:
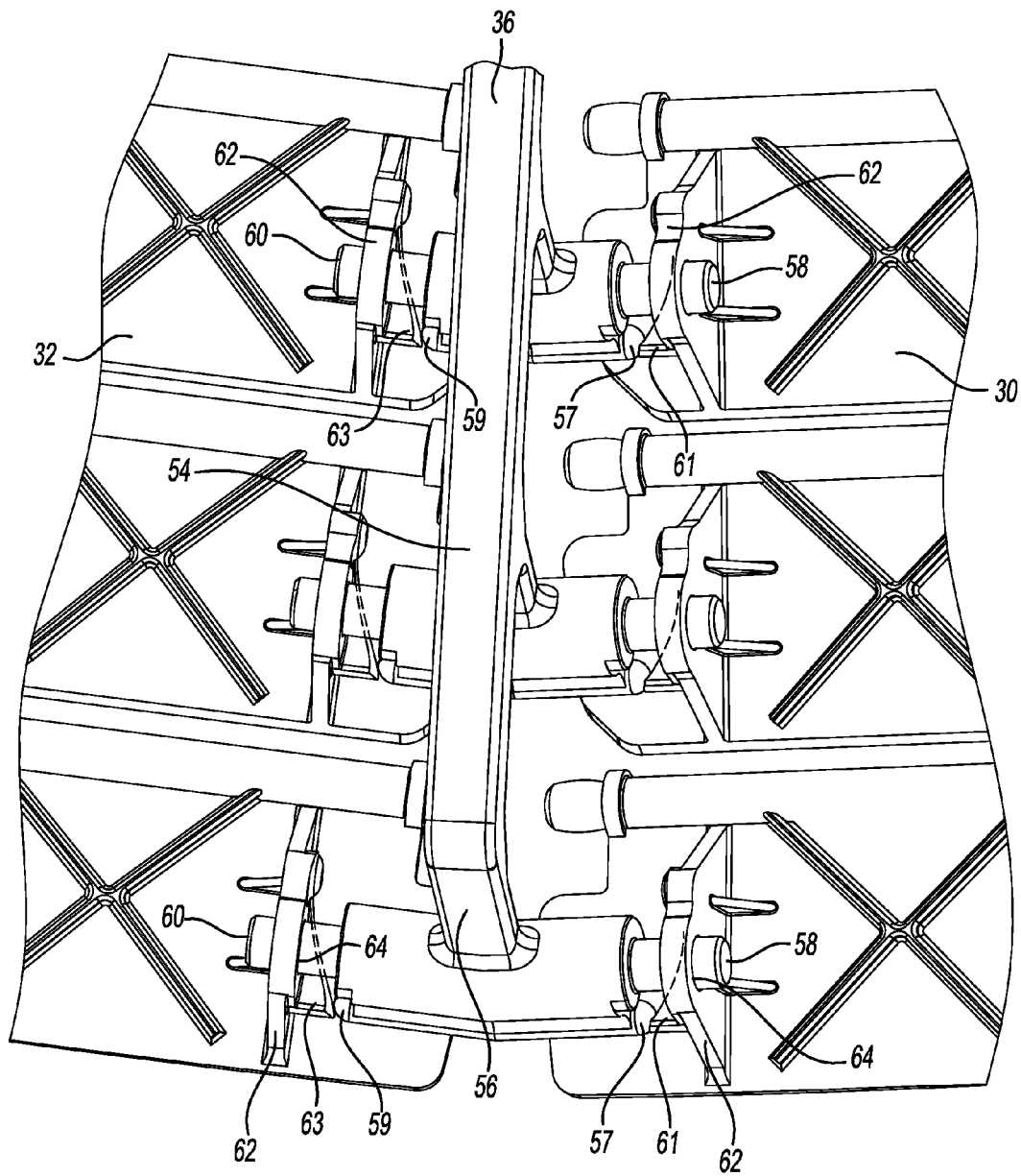
FIG. 8 is a partial perspective view of the grille shutter assembly in the closed position.

A distal end of the legs 56 of the drive link 36 may also include first and second guide members 57, 59 (FIGS. 7 and 8). The first and second guide members 57, 59 may slidably engage corresponding sloped guide members 61, 63 (FIG. 8) of the first and second louvers 30, 32, respectively, to minimize rotation of the drive link 36, thereby preventing binding of the shutter assembly 14 during movement of the louvers 30, 32 between the open and closed positions.

Figure 9:
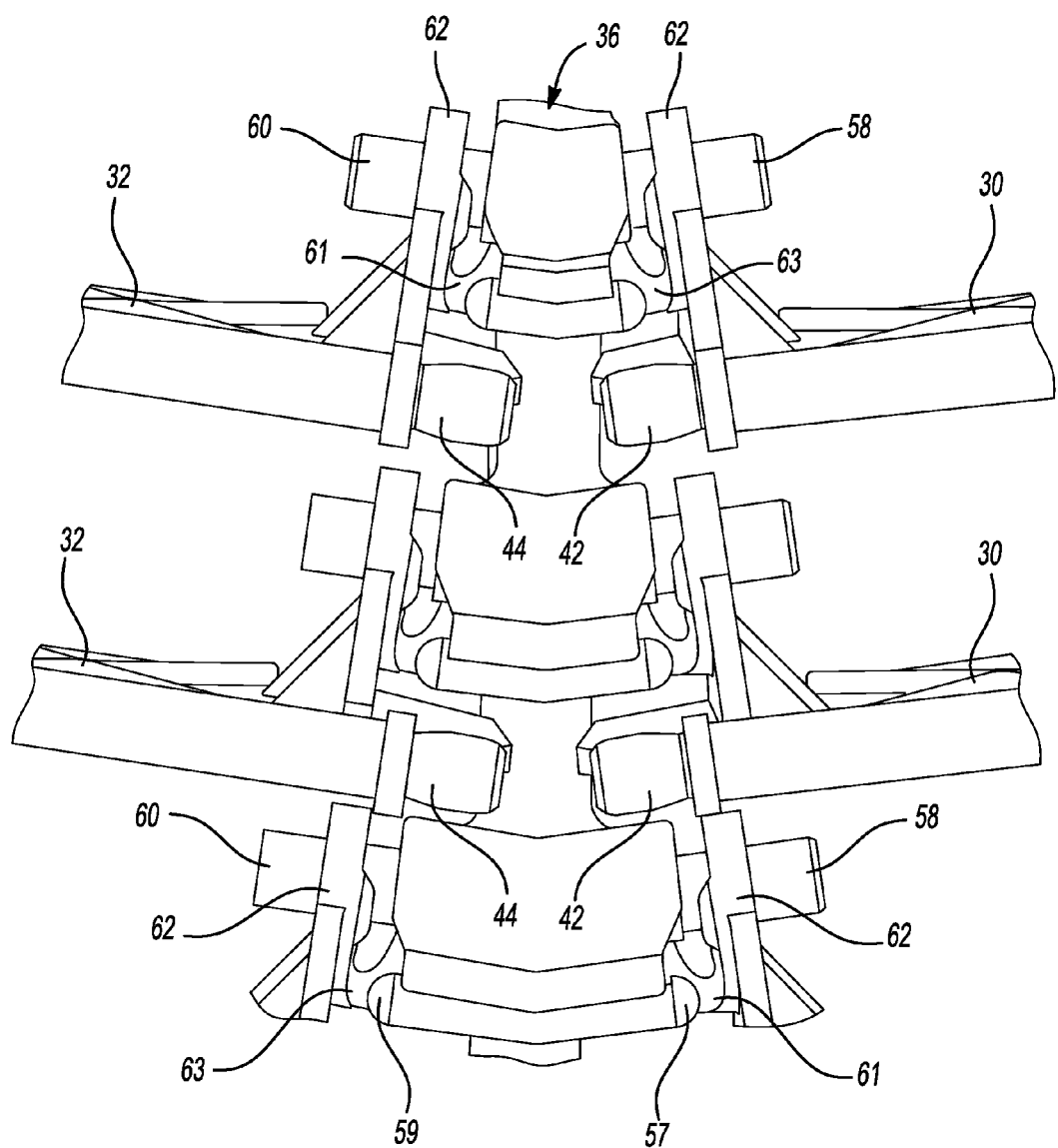
FIG. 9 is a partial perspective view of the grille shutter assembly in the open position.

As shown in FIGS. 3 and 8, each of the louvers 30, 32 may include a flange 62 disposed proximate a corresponding one of the second axle pegs 40, 44. The flange 62 may extend from a side of the louvers 30, 32 that faces toward the back of the vehicle when the louvers 30, 32 are in the closed position. Each flange 62 may include an aperture 64 that rotatably and reciprocatingly receives a corresponding one of the pegs 58, 60 of the drive link 36. In this manner, the drive link 36 may transmit rotational motion of one of the louvers 30, 32 to the rest of the louvers 30, 32 so that the louvers 30, 32 may rotate in sync, as described above. As the louvers 30, 32 move between the open and closed positions, the pegs 58, 60 may slide reciprocate within the apertures 64. That is, when the louvers 30, 32 rotate from the closed position (shown in FIG. 8) to the open position (shown in FIG. 9), there is relative linear motion between the pegs 58, 60 and corresponding apertures 64. This relative linear motion is depicted in FIGS. 8 and 9, whereby the flanges 62 are located closer to the base of the corresponding pegs 58, 60 in the open position (FIG. 9) and are located closer to the distal ends of the corresponding pegs 58, 60 in the closed position (FIG. 8).

The configuration of the drive link 36 described above allows the louvers 30, 32 to be as close as possible to and/or attached to a corresponding horizontal bar 20, 22. For example, when the louvers 30, 32 are in the fully closed position, the louvers 30, 32 may be substantially flush or slightly sub-flush with a rear end of the horizontal bars 20, 22. This allows the louvers 30, 32 to be farther forward which reduces airflow into the compartment to reduce drag on the vehicle, while substantially hiding the louvers 30, 32 from view from the exterior of the vehicle when the louvers 30, 32 are in a fully open position, thereby reducing or eliminating any affect on the desired aesthetic look of the grille 12.

While the louvers 30, 32 are depicted in the figures as including reinforcement ribs 33 (FIG. 2), in some embodiments, only some of the louvers 30, 32 may be provided with the reinforcement ribs 33. For example, the one louver 32 that is directly driven by the motor 34 may be provided with reinforcement ribs 33, while other louvers 30, 32 may not.

It will be appreciated that one or more of the louvers 30, 32 may have any suitable shape or profile other than the shape depicted in the figures. Furthermore, the grille shutter assembly 14 may include any number of sets of louvers.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle grille shutter assembly comprising:
a first louver mounted for rotation about a first rotational axis;
a second louver mounted for rotation about a second rotational axis, the first and second rotational axes being angled relative to each other such that the first and second rotational axes intersect each other at an angle that is less than 180 degrees; and
a drive link connected to the first and second louvers and transmitting rotational motion of the first louver to the second louver, wherein the drive link is connected to the first louver by a first peg attached to one of the first louver and the drive link and rotatably received in a first aperture included in the other of the first louver and the drive link, wherein the drive link is connected to the second louver by a second peg attached to one of the second louver and the drive link and rotatably received in a second aperture included in the other of the second louver and the drive link, the first and second pegs extending along first and second longitudinal axes, respectively, the first and second longitudinal axes being angled relative to each other such that the first and second longitudinal axes intersect each other at an angle that equals the angle between the first and second rotational axes,
wherein rotational motion of the first and second louvers between open and closed positions causes linear movement of the first peg within the first aperture along the first longitudinal axis and linear movement of the second peg within the second aperture along the second longitudinal axis.

2. The grille shutter assembly of claim 1, wherein the first louver includes a first end and a second end, and the second louver includes a first end and a second end, the first end of the first louver is drivingly connected to a drive motor, and the drive link is connected to the first and second louvers proximate the second ends of the first and second louvers.

3. The grille shutter assembly of claim 1, further comprising a plurality of third louvers substantially parallel to the first louver, and a plurality of fourth louvers substantially parallel to the second louver, wherein the drive link is connected to the third louvers and the fourth louvers and transmits rotational motion of the first louver to the third and fourth louvers.

4. The grille shutter assembly of claim 3, wherein the drive link includes an elongated body, a plurality of arms extending from the elongated body, a plurality of third pegs each connected to a respective one of the third louvers, and a plurality of fourth pegs each connected to a respective one of the fourth louvers, wherein one of the arms includes the first and second pegs extending away from each other, and wherein another one of the arms includes one of the third pegs and one of the fourth pegs extending away from each other and angled relative to each other.

5. The grille shutter assembly of claim 4, wherein the drive link extends between a first elongated body end and a second elongated body end, the first and second louvers connected to the first elongated body end of the drive link by one of the arms, the plurality of third louvers and the plurality of fourth louvers connected to the drive link between the first elongated body end and the second elongated body end by the other arms, wherein the distance between the pegs on each of the arms increases moving from the first elongated body end of the drive link to the second elongated body end of the drive link.

6. The grille shutter assembly of claim 1, wherein the first and second louvers are rotatably supported by first and second bars, respectively, of a grille.

7. The grille shutter assembly of claim 6, wherein the first louver restricts airflow between the first bar and a third bar of the grille when the first louver is in a closed position, and wherein the second louver restricts airflow between the second bar and a fourth bar of the grille when the second louver is in a closed position.

8. The grille shutter assembly of claim 6, wherein the first and second louvers are rotatably supported by a frame of the grille, the frame defining an opening that is at least partially traversed by the first and second bars.

9. The grille shutter assembly of claim 8, wherein the first and second bars include integrally formed flanges having apertures that rotatably support the first and second louvers.

10. The grille shutter assembly of claim 1, wherein the first and second louvers include sloped guide members extending therefrom that engage the drive link to minimize rotation of the drive link as the first and second louvers open and close.

11. An assembly for a vehicle comprising:
a grille including an outer frame, a plurality of first bars and a plurality of second bars, the outer frame defining an opening, the first and second bars attached to the frame and extending across at least a portion of the opening;
a plurality of first louvers mounted to the grille and rotatable relative to the grille, each of the first louvers being mounted at a first end to the outer frame and mounted at a second end to a corresponding different one of the first bars, the first end of the first louvers extends past a periphery of the opening to mount to the outer frame, the first louvers being rotatable about first rotational axes;
a plurality of second louvers mounted to the grille and rotatable relative to the grille, each of the second louvers being mounted at a first end to the outer frame and mounted at a second end to a corresponding different one of the second bars, the first end of the second louvers extends past a periphery of the opening to mount to the outer frame, the second louvers being rotatable about second rotational axes, the first rotational axes being angled relative to the second rotational axes such that the first rotational axes and second rotational axes intersect at an angle that is less than 180 degrees; and a drive link connected to the plurality of first louvers and the plurality of second louvers and transmitting rotational motion of one of the first louvers to the rest of the first louvers and the second louvers, wherein the drive link has a plurality of arms, each of the arms including one of a plurality of first pegs and one of a plurality of second pegs, wherein each first peg connects a respective one of the first louvers to the drive link, and each second peg connects a respective one of the second louvers to the drive link, wherein rotational motion of the first and second louvers between open and closed positions causes relative linear movement between first pegs and portions of the first louvers and relative linear movement between second pegs and portions of the second louvers, such that the portions of the first and second louvers slide along respective first and second pegs toward distal ends of the first and second pegs as the first and second louvers rotate from the open position to the closed position.

12. The assembly of claim 11, wherein the first bars are parallel to each other, and the second bars are parallel to each other and angled relative to the first bars.

13. The assembly of claim 11, wherein the angle between the first rotational axes and the second rotational axes is equal to an angle between the first bars and the second bars.

14. The assembly of claim 11, wherein the first end of only one of the first louvers is drivingly connected to a drive motor, and the drive link is connected to the first and second louvers proximate the second ends of the first and second louvers.

15. The assembly of claim 14, wherein the drive link includes an elongated body and the plurality of arms extend from the elongated body, the first and second pegs extending away from each other to engage the first and second louvers.

16. The assembly of claim 11, wherein the first and second bars are horizontal and are angled relative to each other about an axis extending through a central, vertical bar of the grille.

17. The assembly of claim 11, wherein the first and second bars include integrally formed flanges having apertures rotatably supporting the first and second louvers.

18. The assembly of claim 17, wherein the first and second bars are integrally formed with the outer frame.

19. The assembly of claim 11, wherein the drive link extends between a first elongated body end and a second elongated body end and the distance between the first and second pegs on each of the arms increases moving from the first elongated body end of the drive link to the second elongated body end of the drive link.

20. The assembly of claim 11, wherein the first louvers and the second louvers include sloped guide members extending therefrom that engage the drive link to minimize rotation of the drive link as the first louvers and the second louvers open and close.

* * * * *